(12) United States Patent
Buchmann et al.

(10) Patent No.: US 10,483,022 B2
(45) Date of Patent: Nov. 19, 2019

(54) DEVICE AND METHOD FOR MANUFACTURING CABLE SENSORS

(71) Applicant: Robert Bosch GmbH, Stuttgart (DE)

(72) Inventors: Christiane Buchmann, Stuttgart (DE); Mirko Scheer, Besigheim (DE); Cord von Hoersten, Suzhou (CN); Andreas Fink, Heilbronn (DE)

(73) Assignee: Robert Bosch GmbH, Stuttgart (DE)

( * ) Notice: Subject to any disclaimer, the term of this patent is extended or adjusted under 35 U.S.C. 154(b) by 129 days.

(21) Appl. No.: 14/538,140

(22) Filed: Nov. 11, 2014

(65) Prior Publication Data
US 2015/0135528 A1    May 21, 2015

(30) Foreign Application Priority Data
Nov. 18, 2013 (DE) .......................... 10 2013 223 485

(51) Int. Cl.
*H01B 13/14* (2006.01)
*B65H 57/14* (2006.01)
*G01D 11/24* (2006.01)

(52) U.S. Cl.
CPC .............. *H01B 13/14* (2013.01); *B65H 57/14* (2013.01); *G01D 11/245* (2013.01); *Y10T 29/49194* (2015.01); *Y10T 29/53187* (2015.01)

(58) Field of Classification Search
CPC ...... H01B 13/14; B65H 57/14; G01D 11/245; Y10T 29/49194; Y10T 29/53187
USPC ....................................... 29/868, 825, 592.1
See application file for complete search history.

(56) References Cited

U.S. PATENT DOCUMENTS

| | | | | |
|---|---|---|---|---|
| 3,861,018 A | * | 1/1975 | Matsuura | H01R 43/052 29/38 R |
| 5,282,311 A | * | 2/1994 | Tamura | H01R 43/28 29/33 F |
| 5,930,892 A | * | 8/1999 | Kato | H01R 43/01 29/401.1 |
| 6,213,422 B1 | * | 4/2001 | Randazzo | H02K 15/00 242/433.3 |
| 2006/0240710 A1 | * | 10/2006 | Kato | H01R 13/5205 439/587 |
| 2013/0181084 A1 | * | 7/2013 | Sato | B65H 54/02 242/470 |

* cited by examiner

Primary Examiner — Peter Dungba Vo
Assistant Examiner — Azm A Parvez
(74) Attorney, Agent, or Firm — Maginot, Moore & Beck LLP

(57) ABSTRACT

A device for the production of cable sensors that each have at least one sensor and a cable trimmed to a variably pre-definable length includes at least two processing units, and at least one conveying unit. The processing units are configured to load and cut a cable blank, and are further configured to sequentially convey the cable blank along a pre-defined motion track. At least one deflection unit is positioned between adjacent processing units. Each deflection unit includes at least one deflection element that is in contact with or is configured to contact the cable blank. A displacement unit is assigned to and is configured to modify a position of the deflection element in order to influence a length of the motion track of the cable blank so as to obtain variable lengths of cable.

8 Claims, 3 Drawing Sheets

DEVICE AND METHOD FOR MANUFACTURING CABLE SENSORS

This application claims priority under 35 U.S.C. § 119 to patent application no. DE 10 2013 223 485.6, filed on Nov. 18, 2013 in Germany, the disclosure of which is incorporated herein by reference in its entirety.

The disclosure relates to a device for manufacturing cable sensors which in each case include a cable which is trimmed to a variably pre-definable length and which is equipped with at least one sensor.

The disclosure further relates to a method for manufacturing cable sensors.

BACKGROUND

Methods and devices for manufacturing cable sensors are known in principle from the prior art. Cable sensors are distinguished in that they include a sensor which is fixedly connected to a cable. To meet customer-specific requirements, the cable sensor typically includes a cable which is trimmed to a pre-determined length, in order to enable easy integration into the desired system. In this manner, cable sensors which include the sensor, such as, for example, a rotation-speed sensor, on one end of the cable and a connector on the other end for readily connecting to a control unit are known. The electrical/electronic components of the cable sensor are often provided with an extruded coating which serves as protection for the electrical/electronic components. Usually, equipping the cable with the sensor here takes place on one assembly line, and prior trimming of the cable from a cable blank takes place on a separate assembly line. On account thereof, for assembling the cable sensors it is necessary to channel the cable sensors through two separate assembly lines, wherein a corresponding conveying possibility has to be provided between the two assembly lines. On account thereof, inter alia long cycle times result in assembly.

SUMMARY

The device has the advantage that despite assembly being able to be carried out on a single assembly line both the assembly times are shortened and a high flexibility of the cable sensors is ensured. To this end, the device according to the disclosure provides that said device includes at least two processing units for equipping and trimming the cable blank, and at least one conveying unit by means of which the cable blank is sequentially conveyable by the processing units along a pre-definable motion track, wherein at least one deflection unit which is disposed between two adjacent processing units and which includes at least one deflection element which is in/can be brought into contact with the cable blank and a displacement unit which is assigned to the deflection element and which is configured for modifying the position of the deflection element is provided, in order to influence the length of the motion track of the cable blank by modifying the position. The cable blank includes a length which is sufficient for assembling a multiplicity of the cable sensors. It is in particular preferably provided here that the cable blank includes at least one, preferably more, electrical lines which are insulated in relation to one another and are provided with an external insulation, in particular a sheath-type insulation.

Alternatively, the line blank may also be an electrical line which is provided with an insulation only in the later process of the method, for example by one of the processing units.

By means of the deflection element, the length of the motion track can thus be modified by way of a positional change. The motion track of the cable blank may thus be lengthened or shortened. The portion of the as yet untrimmed cable blank lying between the processing units is correspondingly lengthened. On account thereof, it can be achieved that the cable length between the processing stations is variable, such that the cable blank may already be equipped with sensors, in particular also at irregular spacings, despite not yet having been trimmed, and trimming of the cable to form variably long cables which in each case include a sensor is possible later.

According to an advantageous refinement of the disclosure, it is provided that the deflection element is configured as a deflection roller or a deflection wheel. The deflection roller or the deflection wheel are distinguished in that they are rotatably mounted, such that no friction arises between the cable blank and the deflection element and, in particular, damage to the cable blank is avoided. The rotation axle of the deflection roller or of the deflection wheel here is preferably formed by the displacement unit, such that the rotation axle is modifiable in its position by way of actuation of the displacement unit.

It is preferably provided that the displacement unit is configured for relocating the deflection element from an initial status in an at least substantially perpendicular manner in relation to the motion track of the cable blank. In its initial status, the deflection element is preferably disposed, spaced apart from the cable, between the adjacent processing units, such that the cable follows the shortest motion track between the adjacent processing units. Alternatively, in this situation the deflection roller may also bear on the cable without, however, deflecting the same. When the displacement unit is actuated, the deflection element is relocated between the two actuation units, in particular perpendicularly in relation to the original motion track of the cable blank, on account of which the motion path which has to be covered by the cable blank from the one processing unit to the next is lengthened. It is particularly preferably provided that at least one stationary further deflection element, which interacts with the cable blank on the side which is opposite to the displaceable deflection element, is assigned to the deflection element. By way of a corresponding positioning of the further deflection element, so as to be close to the displaceable deflection element, it is achieved that a largest possible deflection of the cable is ensured when the displacement unit is actuated. It is particularly preferably provided that in each case one stationary and/or locationally fixed further deflection element which, at least in the displaced state of the displaceable deflection element, impinges on the cable blank is provided on either side of the displaceable deflection element. The further deflection element or deflection elements are preferably likewise deflection rollers or deflection wheels which are rotatably mounted.

According to an advantageous refinement of the disclosure it is provided that the displacement unit is configured so as to be electromotive, electromagnetic, hydraulic and/or pneumatic. To this end, the displacement unit is assigned a corresponding actuator which operates in an electromagnetic, electromotive, hydraulic or pneumatic manner. Of course, also a plurality of corresponding or different actuators may be assigned to the displacement unit for actuating the same. The respective deflection unit between the processing units is preferably configured so as to be separate, and in this manner can be incorporated in a simple manner into the assembly line or assembly installation. Alternatively, it is preferably provided that the respective deflection unit is assigned to one of the processing units, or is formed by the latter, respectively. On account thereof, the respective processing unit can be configured together with the deflection unit as a module of the assembly installation.

It is furthermore preferably provided that at least one first processing unit is configured as an equipping station. The equipping station supplies the sensor, or at least substantial components of the sensor, to the cable blank, and connects said sensor with the cable blank, preferably with one or more electrical lines of the cable blank. This may sequentially take place in one or more steps in the at least one first processing unit or in a plurality of first processing units. It is in particular provided that the processing unit is configured to first remove an insulation which is optionally present on the line blank on that portion on which the sensor is to be attached, and subsequently to connect the sensor or components of the sensor with the line.

It is furthermore preferably provided that at least one second processing unit is configured as an injection-molding station. In the injection-molding station, the cable blank which has previously been seen by the equipping station with a sensor is extrusion coated in particular with plastic in a preferably portion-wise manner. Here, the extrusion coating takes place on the spot of the cable on which the sensor is attached, such that the sensor is encapsulated by the extrusion coating. On account of the deflection unit which is preferably disposed between the first and the second processing unit, the spacing between the sensors applied to the cable blank can be varied on the cable blank, such that equipping and extrusion coating of the cable blank may take place, or does take place, respectively, in a simultaneous manner on the two processing units despite different length ratios.

According to an advantageous refinement of the disclosure, it is provided that a processing unit which is last in the motion track of the cable is configured as a trimming station. It is provided here that the processing unit through which the cable blank passes last carries out the trimming of the cable, corresponding to the arrangement of the sensors on the cable and/or to the pre-definable lengths. The cable is correspondingly trimmed to the parameters only at the end of the passage through the assembly installation. Up to that point, the different cable lengths are compensated for, or made possible, respectively, by way of the at least one deflection unit between the processing units. The pressure unit preferably includes one, preferably only one, conveying unit by means of which the cable blank is conveyed through the processing unit. It is preferably provided that the only one conveying unit is disposed in the last processing unit, or is assigned to the last processing unit, and is configured to draw the line blank through the processing unit. On account of the advantageous deflection unit/units, the tow may be exposed to tensile load throughout despite variable cable lengths.

It is furthermore preferably provided that between all adjacent processing units in each case one corresponding deflection unit is provided. On account thereof, the longitudinal adaptation of the motion track of the cable blank are correspondingly adaptable between all processing units.

On account thereof, overall a device which, proceeding from a cable blank, in a simple manner makes it possible to manufacture cable sensors, having variable cable lengths, in an assembly installation within short assembly cycles and in a cost-effective manner results.

The method according to the disclosure provides that for equipping and trimming, a cable blank is conveyed through at least two processing units along a pre-definable motion track, and wherein at least one deflection unit which is disposed between two adjacent processing units and which includes at least one deflection element which is in/can be brought into contact with the cable blank and a displacement unit for modifying the position of the deflection element is actuated in order to influence the length of the motion track of the cable blank, so as to obtain the variable lengths. In order to lengthen the motion track, the deflection element is preferably displaced, in particular in a perpendicular manner in relation to the original motion track of the cable blank, from an initial status in which the cable blank is not deflected into a position in which the cable blank is deflected. On account of the displacement of the deflection element, the length of the motion track of the cable blank between the processing units is varied, such that, depending on the cable sensor to be manufactured, a corresponding cable length is adjusted, wherein the trimming of the cable blank, having the sensors situated thereon, takes place only by the processing unit which is last in the sequence. After trimming the cable blank to the required lengths, the cable sensors may be supplied to a further processing unit which equips the free end of the cable with plug connectors or similar. Further advantages and features are derived from the earlier description.

BRIEF DESCRIPTION OF THE DRAWINGS

In the following, the disclosure is to be described in more detail by means of an exemplary embodiment. In the drawings.

DETAILED DESCRIPTION

Figure 1:
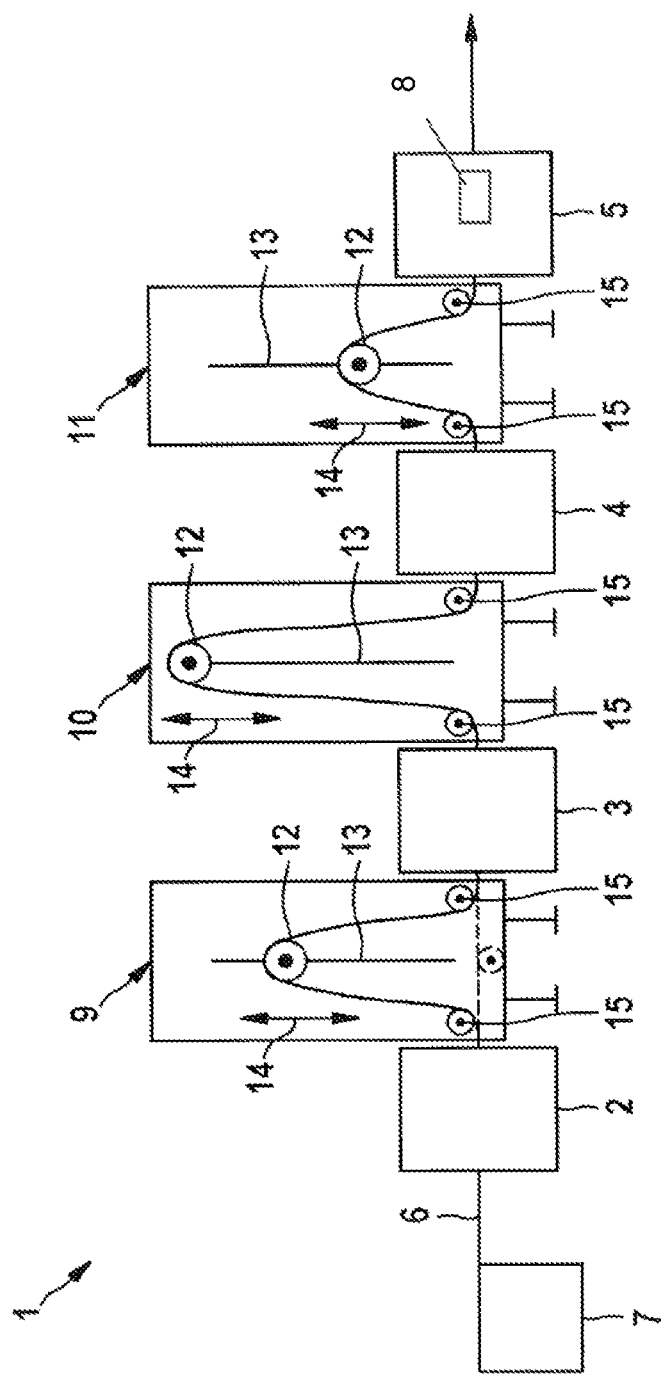
FIG. 1 shows a device for manufacturing cable sensors, in a simplified illustration.

FIG. 1, in a simplified illustration, shows a device 1 for manufacturing cable sensors. The device 1 is configured as an assembly installation which includes a plurality of processing units 2, 3, 4 and 5. A cable blank 6 which is provided by a cable dispenser 7 which, for example, includes a cable drum passes through the processing units 2 to 5. The processing units 2 to 5 are sequentially, that is to say one after the other, passed through by the cable blank 6. Moreover, a conveying unit 8 is integrated in the last processing unit 5 of the processing units 2 to 5, when viewed in the conveying direction, by means of which a tensile force is exertable on the cable 6 in order to convey the cable blank 6 through the processing units 2 to 5.

The processing units 2 to 5 moreover include guide elements for guiding the cable blank 6 in a targeted manner along a pre-defined motion track. The guide elements are advantageously configured as guide rolls, wheels or rollers which are integrated in the processing units and serve to transport the cable blank at low friction. Between adjacent processing units, that is to say between two processing units which follow one another in the motion track of the cable blank 6, in each case one deflection unit 9, 10 and 11 which serves for influencing the motion track of the cable blank 6 is provided.

Each of the deflection units 9 includes a deflection element 12 which is assigned a displacement unit 13. In the present exemplary embodiment the respective displacement unit 13 is configured as a spindle drive having a spindle on which a slide which carries the respective roller and/or the deflection element 12 is disposed so as to be longitudinally displaceable. By way of a rotation movement of the spindle, the respective roller and/or the respective deflection element 12 is thus modified in its position, as is indicated by a double arrow 14. The spindles here, in the present case, are oriented in a vertical manner, while the main motion track of the cable blank 6 through the processing units 2 to 5 runs in a horizontal manner. The deflection elements 12 can thus be displaced in a substantially perpendicular manner in relation to the direction of movement of the cable blank 6.

The deflection units 9, 10 and 11 moreover include in each case two further deflection elements 15 which are disposed so as to be locationally fixed and are configured as deflection rollers. In relation to the displaceable deflection element 12, one of the locationally fixed deflection rollers, when viewed in the direction of movement of the cable blank, is disposed in front of the deflection roller 12, and the other locationally fixed deflection roller 15 is disposed behind the deflection element 12, wherein, according to the present exemplary embodiment, the cable blank 6 runs below the locationally fixed deflection rollers and over the displaceable deflection roller (deflection element 12). Of course, a reversed arrangement in which the displaceable deflection element 12 impinges on the cable blank 6 from above and the locationally fixed deflection elements 15 impinge on the cable blank 6 from below is also conceivable. According to a further exemplary embodiment not illustrated here it is preferably provided that the further deflection elements 15 are displaceable in the direction which is counter to that of the displaceable deflection element 12 by a corresponding displacement unit, in order to further lengthen the motion path of the cable through the respective deflection unit.

In an initial position of the deflection elements 12, such as is indicated in a dashed manner for the deflection unit 9, the deflection rollers 15 and the displaceable deflection element 12 are disposed in such a manner that the cable blank 6 is guided without deflection, that is to say directly from the processing unit 2 to the processing unit 3. However, if the displacement unit 13 is actuated such that the displaceable deflection element 12 is relocated upward in a vertical manner, the cable blank 6 is deflected to a corresponding extent, on account of which the motion path of the cable blank 6 from the processing unit 2 to the processing unit 3 is correspondingly lengthened. The same applies to the deflection units 10 and 11.

In the present case, the cable blank 6, having one or more lines which are surrounded by insulation, is made available by the cable dispenser 7. The first processing unit 2 removes part of the insulation from the cable blank 6 and optionally already attaches first contacts to the line or lines. Subsequently, the cable blank 6 is guided through the deflection unit 9 to the processing unit 3. The position of the deflection element 12 of the deflection unit 9 here is chosen in such a manner that between the processing unit 2 and the processing unit 3 the cable blank at least substantially includes a length which is pre-defined for the cable sensor to be manufactured.

The processing unit 3, which is next downstream, in the present case is configured as an equipping station which equips the cable blank 6 with the desired sensor, or with the desired sensor electronics, respectively, and electrically connects the latter with the line or lines, or with the previously attached contacts, respectively, of the cable blank 6. Subsequently, the cable blank 6 is guided through the deflection unit 10 to the processing unit 4. The motion track which is determined by the respective deflection unit 9, 10, 11, and thus the accompanying motion path for the cable blank 6, is always adjusted so as to correspond to the position of the cable blank 6 and the portions provided thereon for the individual cable sensors, such that during processing of the cable blank 6 by the processing units 2 to 5, the cable blank does not sag at any spot, in particular not between the processing units 2 to 5.

The processing unit 4, in the present exemplary embodiment, is configured as an injection-molding station in which the sensor which has been attached to the cable 6 by the processing unit 3 is extrusion coated and encapsulated with a plastic. Injection molding here may take place in one or more steps, or with one or more materials.

Subsequently, the cable 6 is guided through the deflection unit 11 to the processing unit 5, wherein, also here, the position of the deflection element 12 is again correspondingly chosen.

According to the present exemplary embodiment, the processing unit 5, as the last of the processing units, is configured as a trimming station in which the cable blank 6 is trimmed to a length which is assigned to the sensor. Subsequently, the correspondingly trimmed cable is delivered from the processing unit 5 for further processing, as is indicated by an arrow. In the further processing, by means of a further processing unit a plug connector may be added to the free end of the cable, for example. Alternatively, the plug connector is attached to the cable by the last processing unit 5.

The device 1 has the advantage that, on account of the adjustable deflection elements 12, by means of the only conveying unit 8 which pulls the cable 6 through the processing units 2 to 5, the assembly of a plurality of cable sensors which include variable cable lengths is possible in one processing installation. Here, the deflection rollers 12 have only to be modified in their position, depending in each case on the desired trimming. For comparatively long cables, the deflection elements 12 are relocated to a corresponding extent, in order to achieve as large as possible an elongation of the cable 6; for short cable sensors, the deflection elements are correspondingly relocated into a position in which the cable 6 passes through only a short motion track from one processing unit to the next.

Figure 2:
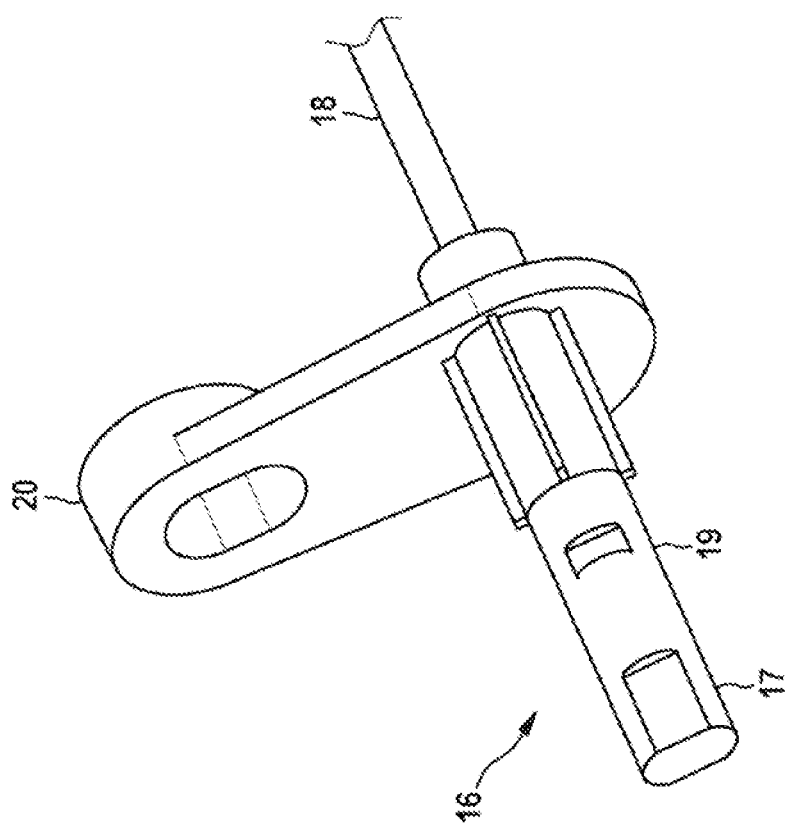
FIG. 2 shows a cable sensor which has been manufactured by the device.

FIG. 2, in an exemplary manner, shows in a perspective illustration a cable sensor 16 which has been manufactured by the device 1 and which includes a sensor 17 which is attached to a free end of a cable 18 which has been manufactured by trimming the cable blank 6. On the other end of the cable 18 (not illustrated here) a plug connector which enables simple linking of the cable sensor 16 to a corresponding system is preferably provided.

Alternatively to the above-described exemplary embodiment of the processing units 2 to 4, it may be provided that the first processing unit 2 is configured as an equipping unit which equips the cable 6 with the desired sensor and carries out all steps necessary therefor, the processing unit 3 as first injection-molding station, and the processing unit 4 as second injection-molding station. Here, the first injection-molding station is configured for providing the sensor 17 with a plastic cap 19, while the second injection-molding station is configured for manufacturing a plastic flange 20 on the sensor 17, or on the free cable end of the cable sensor 16, respectively, which facilitates mounting the cable sensor 16 on a body of a vehicle, for example.

Figure 3:
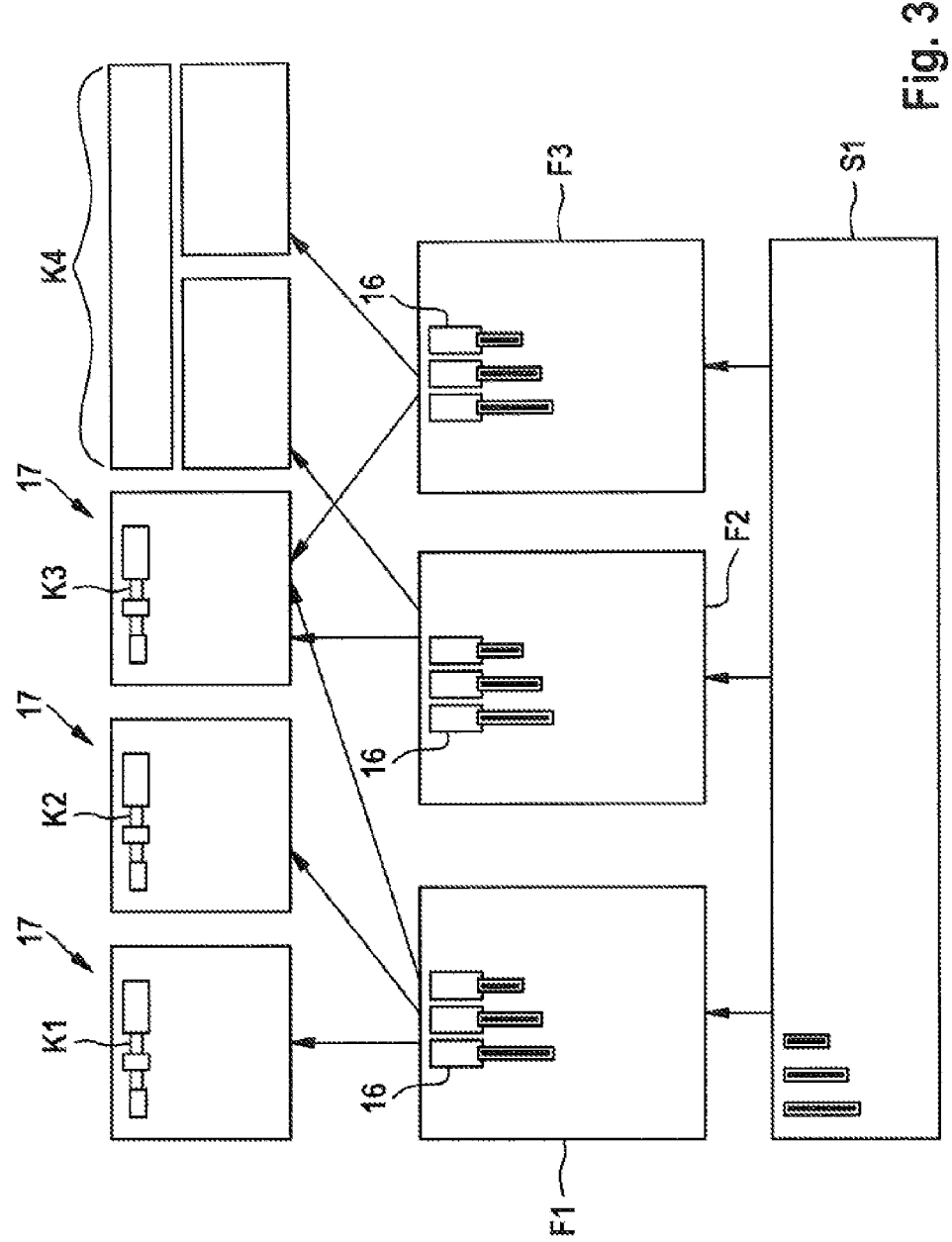
FIG. 3 shows an alternative method for manufacturing cable sensors.

FIG. 3 shows a further method for manufacturing cable sensors, in a simplified flow diagram. In a first step S1, line blanks which have variable blank lengths are manufactured. The blank length of the line blank depends on the requirement and the concept of the respective assembly line F1, F2 or F3, and on the requirements of the later product, or the finished cable sensor, respectively. Subsequently, the line blanks are equipped with the afore-mentioned sensors 16, in particular rotation-speed sensors, and supplied to different assembly lines F1, F2 and F3. Subsequently, the line blanks are supplied to a final confectioning K1, K2, K3 or K4, and trimmed to the desired final length of the respective cable sensor. The line blanks, having letterings, are passed on to the final confectioning in which the confectioning and the final application of the respective cable sensor takes place, for example by adding (extrusion coating) a fastening flange. In the manufacture of rotation-speed detectors, or rotation-speed sensors, respectively, depending on the sensing direction, the orientation in relation to an encoder or steel wheel, three substantial variants result in assembly, one having a permanent magnet and the others without the latter. Application and confectioning may optionally also be carried out by way of external line confectioners.

In contrast to the prior art, here application of the respective sensor to the line blank therefore takes place and not, as is currently usual, to already completely confectioned or trimmed cables, respectively.

What is claimed is:

1. A device for manufacturing wire sensors that each includes at least one sensor and a wire trimmed to a respective variably pre-defined length, the device comprising:
    at least two processing units configured to load and trim a wire blank;
    at least one conveying unit via which the at least two processing units are configured to convey the wire blank sequentially between the at least two processing units along a pre-defined motion track; and
    at least one deflection unit disposed between successive ones of said at least two processing units that includes:
        at least one deflection element that is either (i) in contact with or (ii) is configured to come into contact with the wire blank; and
        a displacement unit assigned to the at least one deflection element and configured to modify a position of the assigned deflection element in order to influence a length of the motion track;
    wherein one of the at least two processing units is configured to load the wire blank with at least one feature from a group comprising an electrical contact, a sensor, a sensor electronics and an encapsulation of the sensor, and wherein another different one of the at least two processing units is configured to trim the wire blank, said different one of the at least two processing units positioned sequentially apart from said one of the at least two processing units along said pre-defined motion track,
    wherein a respective one of the at least one deflection unit is positioned between each of the at least two processing units.

2. The device according to claim 1, wherein the at least one deflection element is a deflection roller or a deflection wheel.

3. The device according to claim 1, wherein the displacement unit is configured to relocate the assigned deflection element from an initial position in an at least substantially perpendicular direction relative to the motion track.

4. The device according to claim 1, wherein the displacement unit is at least one of electromotive, electromagnetic, hydraulic, and pneumatic.

5. The device according to claim 1, wherein a first processing unit of the at least two processing units is an equipping station configured to equip the wire blank with the sensor or with the sensor electronics.

6. The device according to claim 1, wherein a second processing unit of the at least two processing units is an injection-molding station configured to encapsulate the sensor.

7. The device according to claim 1, wherein a last processing unit of the at least two processing units that is positioned last in the motion track is a trimming station configured to trim the wire blank.

8. The device according to claim 1, wherein:
    the at least two processing units includes three or more processing units: and
    a respective one of the at least one deflection unit is positioned between each of the three or more processing units.

* * * * *